(12) United States Patent
Ma et al.

(10) Patent No.: US 10,404,591 B2
(45) Date of Patent: Sep. 3, 2019

(54) STATUS MONITORING OF INLINE NETWORK TOOLS

(71) Applicant: Gigamon Inc., Santa Clara, CA (US)

(72) Inventors: Yingchun Ma, Sunnyvale, CA (US); Yan Xiu, San Ramon, CA (US); Ramakrishna Manchiraju-Venkata, Sunnyvale, CA (US); Zbigniew Sufleta, Cobb, CA (US)

(73) Assignee: Gigamon Inc., Santa Clara, CA (US)

( * ) Notice: Subject to any disclaimer, the term of this patent is extended or adjusted under 35 U.S.C. 154(b) by 7 days.

(21) Appl. No.: 15/428,784

(22) Filed: Feb. 9, 2017

(65) Prior Publication Data

US 2018/0091432 A1 Mar. 29, 2018

Related U.S. Application Data

(63) Continuation of application No. 15/409,903, filed on Jan. 19, 2017.

(Continued)

(51) Int. Cl.
| | |
|---|---|
| *H04L 12/851* | (2013.01) |
| *H04L 12/46* | (2006.01) |
| *H04L 12/947* | (2013.01) |
| *H04L 12/935* | (2013.01) |
| *H04L 29/12* | (2006.01) |

(Continued)

(52) U.S. Cl.
CPC .......... *H04L 45/74* (2013.01); *H04L 1/24* (2013.01); *H04L 12/4641* (2013.01); *H04L 43/028* (2013.01); *H04L 43/04* (2013.01); *H04L 43/0817* (2013.01); *H04L 43/16* (2013.01); *H04L 47/125* (2013.01); *H04L 47/2483* (2013.01); *H04L 47/25* (2013.01); *H04L 49/25* (2013.01); *H04L 49/30* (2013.01);

(Continued)

(58) Field of Classification Search
None
See application file for complete search history.

(56) References Cited

U.S. PATENT DOCUMENTS

| | | |
|---|---|---|
| 6,765,866 B1 | 7/2004 | Wyatt |
| 6,801,950 B1 | 10/2004 | OKeeffe et al. |

(Continued)

OTHER PUBLICATIONS

Non-Final Office Action dated Apr. 16, 2018 for U.S. Appl. No. 15/409,903 of Yingchun Ma, filed Jan. 19, 2017, 12 pages.

(Continued)

*Primary Examiner* — Robert C Scheibel
(74) *Attorney, Agent, or Firm* — Perkins Coie LLP

(57) ABSTRACT

A packet broker deployed in a visibility fabric may intelligently assign identifiers to data packets that are routed through sequences of one or more network tools for monitoring and/or security purposes. Guiding techniques based on these identifiers offer flexible support for multiple network tool operational modes. For example, the packet broker may be able to readily address changes in the state of a network tool connected to the packet broker by modifying certain egress translation schemes and/or ingress translation schemes. The "state" of a network tool can be "up" (i.e., ready for service) or "down" (i.e., out of service) based on, for example, the network tool's ability to pass through health-probing data packets dispatched by the packet broker.

24 Claims, 13 Drawing Sheets

Related U.S. Application Data

(60) Provisional application No. 62/400,452, filed on Sep. 27, 2016.

(51) Int. Cl.

| | | |
|---|---|---|
| *H04L 12/741* | (2013.01) | |
| *H04L 29/06* | (2006.01) | |
| *H04L 1/24* | (2006.01) | |
| *H04L 12/26* | (2006.01) | |
| *H04L 12/803* | (2013.01) | |
| *H04L 12/825* | (2013.01) | |

(52) U.S. Cl.
CPC .......... *H04L 61/2596* (2013.01); *H04L 69/22* (2013.01); *H04L 61/6068* (2013.01)

(56) References Cited

U.S. PATENT DOCUMENTS

| | | | | |
|---|---|---|---|---|
| 9,806,907 | B2* | 10/2017 | Nachum | H04L 12/6418 |
| 9,866,478 | B2* | 1/2018 | Laxman | H04L 45/745 |
| 2006/0114876 | A1 | 6/2006 | Kalkunte | |
| 2012/0210416 | A1 | 8/2012 | Mihelich et al. | |
| 2013/0272305 | A1* | 10/2013 | Lefebvre | H04L 47/24 |
| | | | | 370/392 |
| 2015/0215819 | A1* | 7/2015 | Bosch | H04W 24/02 |
| | | | | 370/221 |
| 2015/0263889 | A1* | 9/2015 | Newton | H04L 47/10 |
| | | | | 370/254 |
| 2015/0281063 | A1* | 10/2015 | Bitar | H04L 45/74 |
| | | | | 370/392 |
| 2015/0319030 | A1 | 11/2015 | Nachum | |
| 2015/0373263 | A1 | 12/2015 | Georgiev et al. | |
| 2016/0149788 | A1* | 5/2016 | Zhang | H04L 43/10 |
| | | | | 709/224 |
| 2016/0285685 | A1* | 9/2016 | Zhou | H04L 41/0816 |
| 2016/0285973 | A1* | 9/2016 | Shah | G06F 21/55 |
| 2017/0019302 | A1* | 1/2017 | Lapiotis | H04L 41/145 |
| 2017/0026287 | A1* | 1/2017 | Vinsel | H04L 45/66 |
| 2017/0026289 | A1* | 1/2017 | Vinsel | H04L 45/7453 |
| 2017/0034043 | A1* | 2/2017 | Tochio | H04L 45/22 |
| 2017/0126815 | A1* | 5/2017 | Kim | H04L 47/76 |
| 2017/0134265 | A1* | 5/2017 | Haddad | H04L 45/38 |
| 2017/0134309 | A1 | 5/2017 | Sufleta et al. | |
| 2017/0134538 | A1* | 5/2017 | Mahkonen | H04L 69/22 |
| 2017/0149632 | A1* | 5/2017 | Saltsidis | H04L 41/5054 |
| 2017/0237632 | A1 | 8/2017 | Hegde et al. | |
| 2017/0359255 | A1* | 12/2017 | Manghirmalani | H04L 69/22 |
| 2018/0013638 | A1* | 1/2018 | Guichard | H04L 67/10 |
| 2018/0091421 | A1 | 3/2018 | Ma et al. | |

OTHER PUBLICATIONS

Notice of Allowance dated Oct. 23, 2018 for U.S. Appl. No. 15/409,903 of Yingchun Ma filed Jan. 19, 2017; 11 pages.

Non-Final Office Action dated Jul. 5, 2018 for U.S. Appl. No. 15/428,815 of Yingchun Ma, filed Feb. 9, 2017, 21 pages., dated Jul. 5, 2018.

Notice of Allowance dated Dec. 20, 2018; U.S. Appl. No. 15/428,815., dated Dec. 20, 2018, 6 pages.

Notice of Allowance dated Nov. 23, 2018 for U.S. Appl. No. 15/428,815 of Yingchung Ma et al. filed Feb. 9, 2017; 9 pages.

* cited by examiner

STATUS MONITORING OF INLINE NETWORK TOOLS

CROSS-REFERENCE TO RELATED APPLICATION

This application is a continuation of U.S. patent application Ser. No. 15/409,903 titled "Flexible Inline Arrangements for Guiding Traffic Through Network Tools" and filed on Jan. 19, 2017, now U.S. Pat. No. 10,178,026, issued Jan. 8, 2019, which claims priority to U.S. Provisional Patent Application No. 62/400,452 titled "Flexible Inline Arrangements for Guiding Network Traffic" and filed on Sep. 27, 2016, each of which is incorporated by reference herein in its entirety.

FIELD OF THE INVENTION

At least one embodiment of the present disclosure pertains to systems and techniques for guiding network traffic, and more particularly, to techniques for intelligently guiding network traffic through sequences of inline network tools.

BACKGROUND

Traffic in a computer network can be analyzed to improve real-time decision making for network operations, security techniques, etc. The traffic may be acquired at numerous entry points by a variety of devices and/or applications (collectively referred to as "nodes" in the computer network) to provide extensive visibility of traffic flow and network security. This network of devices and/or applications, which may include physical devices, virtual devices, and Software Defined Networking (SDN)/Network Function Virtualization (NFV) environments, may be collectively referred to as the computer network's visibility fabric. Given the complexity and volume of traffic routed through many infrastructures, various kinds of network tools are often used to identify, analyze, and/or handle security threats to the computer network, bottlenecks in the computer network, etc. Examples of such network tools include an intrusion detection system (IDS), an intrusion prevention system (IPS), a network monitoring system, and an application monitoring system.

Network appliances and network tools can operate as in-band (i.e., "inline") devices or out-of-band devices. Out-of-band devices operate outside of the path of data traffic between an origination node and a destination node and receive copies of the data packets that make up the traffic, rather than the original data packets. Out-of-band devices are able to freely modify the copies of the data packets because the original data packets are allowed to traverse the computer network unimpeded. Inline devices, on the other hand, operate within the path of data traffic between an origination node and a destination node and receive and forward the original data packets.

Network switches communicatively coupled between nodes in the computer network often guide data packets to centralized tools for processing. To be more responsive to emerging security threats, many out-of-band network tools that passively monitor traffic are moved to inline deployments. Consequently, data packets originating from one node within the computer network are guided through the inline network tool before continuing on to another node within the computer network. However, effective guiding of data packets received by a network appliance can be difficult, particularly when one or more inline network tools communicatively coupled to the network appliance experience an issue (e.g., lose power or discover a security threat and stops forwarding traffic).

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION

Figure 1:
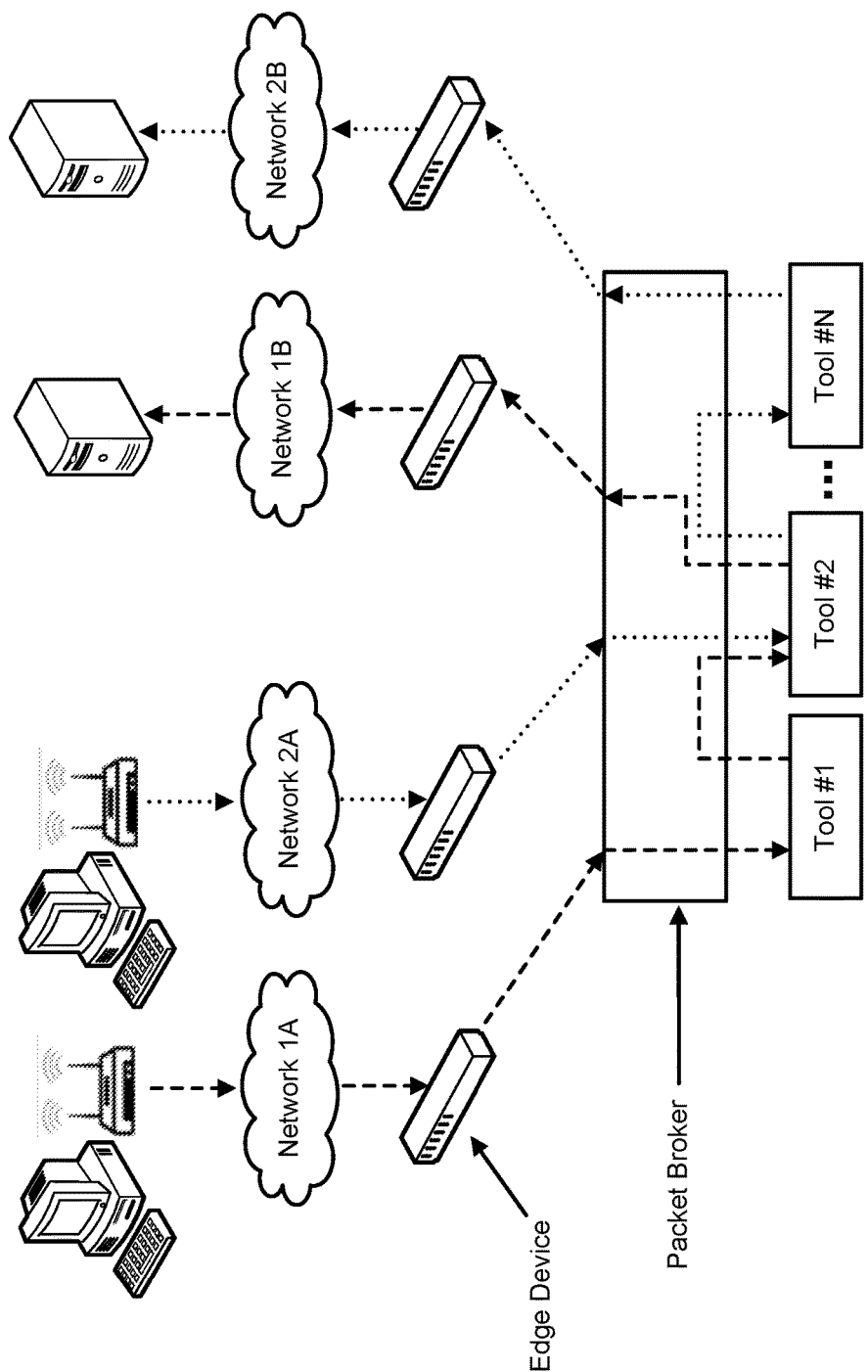
FIG. 1 depicts an example of a network arrangement in which a packet broker receives data packets from multiple edge devices (also referred to as "nodes") in different computer networks.

In this description, references to "an embodiment," "one embodiment," and the like, mean that the particular feature, function, structure, or characteristic being described is included in at least one embodiment introduced here. Occurrences of such phrases in this specification do not necessarily all refer to the same embodiment, nor are the embodiments referred to herein necessarily mutually exclusive.

A packet broker (also referred to as a "network appliance") may be a node in a computer network that can be configured to receive data packets from one or more other nodes within the computer network. Moreover, a packet broker can act as a visibility fabric or as part of a visibility fabric. Often, the packet broker is coupled to one or more network tools configured to analyze the data packets (or copies of the data packets), monitor the traffic within the computer network, and/or attempt to block or stop the transmission of abnormal (e.g., malicious) data packets.

Packet brokers and network tools may be operable as inline devices and/or an out-of-band devices. Inline devices are configured to receive data packets from one or more other nodes within a computer network and reside within the path of data traffic. Consequently, any interruptions to an inline device's ability to manage the network traffic affect the functionality and availability of a traffic path and can compromise the computer network as a whole.

While conventional packet brokers may be communicatively coupled to multiple network tools, these network tools are exclusive to a single stream of traffic (also referred to as a "traffic flow"). Said another way, conventional packet brokers are not able to share network tools across multiple streams of traffic because the packet brokers are unable to determine which stream data packets that are returned by a shared network tool belong to.

Introduced here, therefore, are systems and techniques for intelligently guiding traffic through sequences of one or more network tools (also referred to as "inline packet inspection devices") that are coupled to a packet broker. Each sequence can include a subset of all network tool(s) coupled to the packet broker, and some or all of the network tool(s) may be shared by multiple streams of traffic. By assigning identifiers to data packets within each stream of traffic, a packet broker can efficiently determine which stream of traffic an incoming data packet belongs to. Consequently, the packet broker enables network tools to be shared by multiple streams of traffic, thereby lowering cost and increasing technical simplicity and efficiency of a computer network monitoring system.

More specifically, the packet brokers described herein are able to determine where to guide data packets based on identifiers (e.g., internal and/or external identifiers) that are appended to each data packet by the packet brokers. The identifiers may be assigned based on packet-matching criteria that consider one or more characteristics of each data packet (e.g., an ingress port identifier, source node identifier, destination node identifier, unique packet identifier, packet length, transmission protocol, priority level identifier, payload data characteristic, application port setting, or some combination thereof). Such a technique allows the packet broker to guide specific streams of traffic belonging to multiple monitored links through the same or different sequences of one or more network tools.

General System Overview

FIG. 1 depicts an example of a network arrangement in which a packet broker receives data packets from multiple edge devices (also referred to as "nodes") in different computer networks. The nodes couple an originating device (e.g., a desktop computer system) to a recipient device (e.g., a server) and allow data packets to be transmitted between the originating device and the recipient device. Examples of nodes include switches, routers, firewalls, and network taps.

Each node represents an entry point to a computer network. The entry points could be, and often are, for different computer networks. For example, forwarding a data packet from the originating device to the recipient device may require the data packet be passed from one node connected to a public network (e.g., the Internet) to another node connected to a private network. Security measures are often implemented between these nodes due to the risk of potentially dangerous traffic (e.g., malicious traffic) leaving the public network and penetrating the private network.

Generally, at least some of the nodes are operable to transmit data packets received as network traffic (or duplicate copies of the data packets) to a packet broker for analysis. Thus, the network traffic is directed to the packet broker by a node that provides an entry point into a computer network.

Whether a node transmits the original data packets or copies of the data packets to a device downstream of the node (e.g., the packet broker) depends on whether the downstream device is an inline device or an out-of-band device. As noted above, inline devices receive the original data packets, while out-of-band devices receive copies of the original data packets. The packet broker is often deployed as an inline device and, thus, receives the original data packets from whichever node is immediately upstream of the packet broker.

Here, for example, the packet broker can receive original data packets from an edge device connected to Network 1A and pass at least some of the original data packets to an edge device connected to Network 1B. Some or all of the edge devices can be configured in a similar fashion.

When the packet broker is deployed as an inline device, data packets are received by the packet broker at a physical network port (also referred to as an "ingress port"). For example, data packets transmitted by the edge device connected to Network 1A are received by the packet broker at a particular network port. The packet broker may include multiple network ports coupled to different edge devices connected to different computer networks. The packet broker may be, for example, part of a monitoring platform that includes a chasses and interchangeable blades offering various functionalities, such as enhanced packet distribution and masking/filtering capabilities.

The packet broker can also include multiple physical tool ports that are coupled to different network tools (e.g., Tool #1, Tool #2, Tool #N). As further described below, each network tool can be deployed as an inline device or an out-of-band device at any given point in time. An administrator of the packet broker may be able to switch the deployment mode of one or more of the network tools. That is, the administrator may be able to deploy an out-of-band network tool as an inline device and vice versa. When a network tool is deployed as an out-of-band device, the packet broker creates a duplicate copy of at least some of the data packets received by the packet broker, and then passes the duplicate copies to a tool port for transmission downstream to the out-of-band network tool. When a network tool is deployed as an inline device, the packet broker passes at least some of the original data packets to a tool port for transmission downstream to the inline network tool, and those data packets are then normally received back from the tool at a separate tool port of the packet broker (assuming the data packets are not blocked by the tool).

FIG. 1 illustrates two example paths of a data packet as the data packet travels from an originating device to a recipient device. More specifically, FIG. 1 depicts a network arrangement in which a packet broker (also referred to as a "network appliance") and several network tools are deployed as inline devices (i.e., within the flow of network traffic). Although the transmission paths connecting the packet broker are half duplex wires (i.e., only transmit information in one direction), full duplex wires capable of transmitting information in both directions could also be used for some or all of the transmission paths between the edge devices, packet broker, and network tools.

After receiving a data packet from the edge device connected to Network 1A, the packet broker can identify a flow map corresponding to the data packet based on one or more characteristics of the data packet. For example, the characteristic(s) could include the communication protocol of which the data packet is a part (e.g., HTTP, TCP, IP) or a session feature (e.g., a timestamp). Additionally or alternatively, the proper flow map could be identified based on the network port (of the packet broker) on which the data packet was received, or the source edge device from which the data packet was received.

The flow map represents a policy for how the data packet is to be handled by the packet broker. For example, the flow map could indicate that the data packet is to be aggregated with another data packet, filtered, modified (e.g., stripped of a header or payload), or forwarded to one or more tool ports. Moreover, the flow map could specify that the data packet is to be transmitted in a one-to-one configuration (i.e., from a network port to a single tool port) or one-to-many configuration (i.e., from a network port to multiple tool ports). The flow map may be represented using packet-matching criteria that are stored in a content-addressable memory (CAM) of the packet broker.

Similarly, a single tool port of the packet broker could receive data packets from one or more network ports of the packet broker. Here, for example, the tool port connected to Tool #2 receives data packets corresponding to multiple traffic flows. Some or all of the network tools connected to the packet broker may be shared by multiple traffic flows.

Often, the data packet is passed (e.g., by a processor of the packet broker) to a tool port for transmission downstream to a network tool (e.g., a monitoring and/or security tool). Here, for example, the flow map may specify that data packets received from the edge device connected to Network 1A are to be passed by the packet broker to a tool port for transmission downstream to Tool #1, while data packets received from the edge device connected to Network 2A are to be passed by the packet broker to a tool port for transmission downstream to Tool #2. In some embodiments, the packet broker aggregates or modifies the data packet in accordance with a policy specified by the flow map before passing the data packet to a tool port for transmission downstream. As further described below, the packet broker may include multiple tool ports, each of which is coupled to a different network tool.

After analyzing the data packet, a network tool normally transmits the data packet back to the packet broker (i.e., assuming the network tool does not determine that the packet should be blocked), which passes the data packet to another tool port for transmission to another network tool or a network port for transmission downstream to another edge device. Because traffic is guided through the packet broker and one or more network tools in an inline deployment, it is important to ensure the data packets are properly dispatched to the proper location by the packet broker. Such issues are magnified when one or more network tools connected to the packet broker are shared by multiple traffic flows (i.e., because the packet broker must be able to distinguish the traffic flows from one another upon receiving data packets from a shared network tool).

Flexible Arrangements of Inline Network Tools

Conventional network appliances are limited in their ability to properly route traffic through network tools in such scenarios, particularly if any of the network tools are shared by multiple traffic flows. For example, when a conventional network appliance receives filtered traffic from a shared network tool that analyzes multiple traffic flows, the conventional network appliance may not be able to distinguish which traffic flow a data packet belongs to upon receiving the data packet from the shared network tool. A "traffic flow" is a stream of data packets that arrives at a packet broker through a specific interface (e.g., physical ingress port). As further described below, these data packets may also meet a specific set of packet-matching criteria (e.g., by arriving at a specific port or by carrying Internet Protocol (IP) source addresses falling within a specific range). Connectivity control of conventional network appliances can also become extremely complicated when network tools deployed as inline devices fail (which requires that one or more traffic paths be rearranged or rerouted).

Introduced here, therefore, are techniques for guiding multiple traffic flows through sequences of network tools (also referred to as "packet inspection devices"). Each sequence of network tools can include some or all of the network tools connected to a packet broker, which selectively passes or blocks data packets exchanged between an originating device and a recipient device. Such techniques address the limitations of conventional network appliances and allow specific traffic flows belonging to multiple monitored links to be guided through sequences of one or more network tools, both shared and exclusive.

Figure 2:
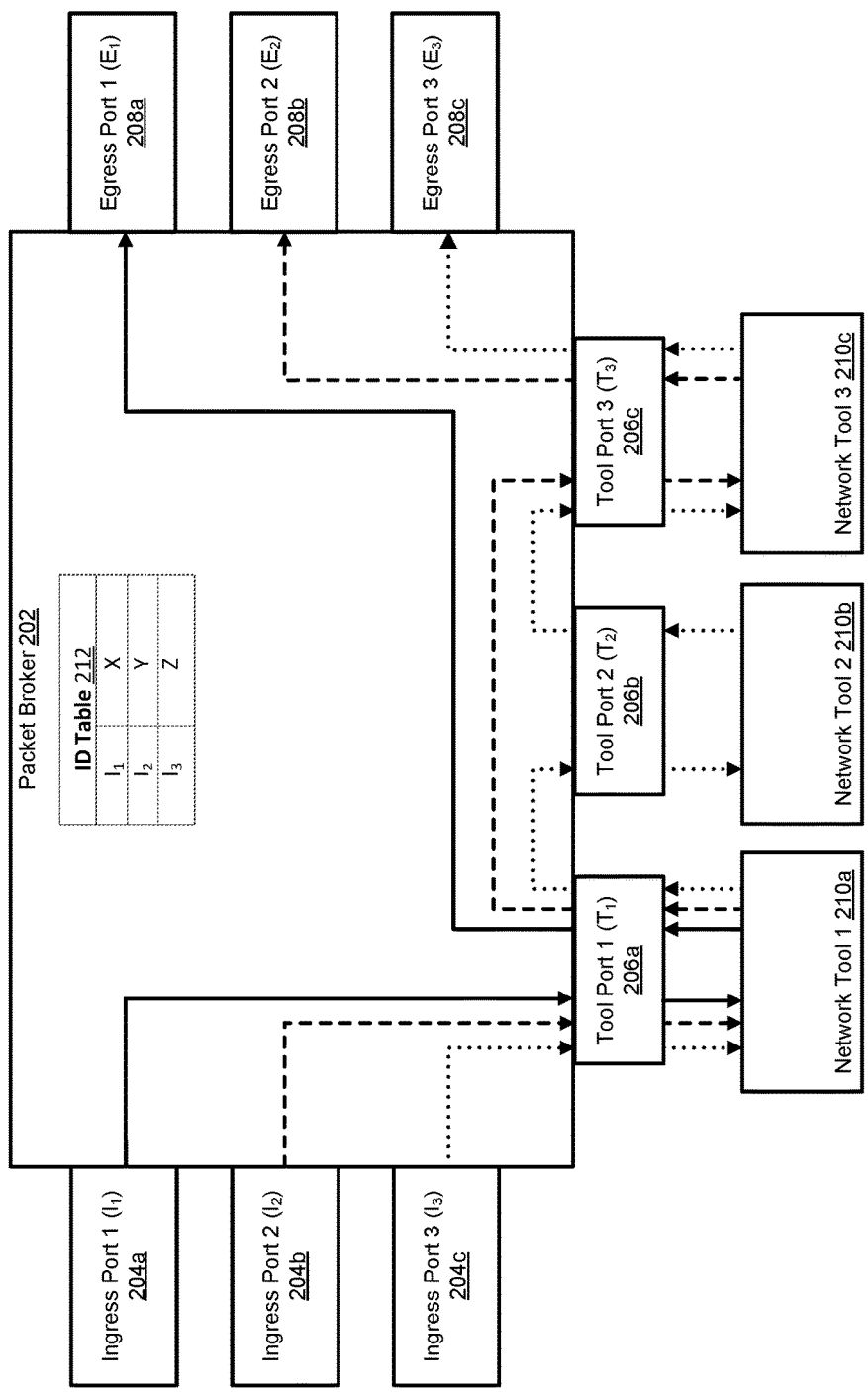
FIG. 2 illustrates how tagging mechanisms can be used to guide data packets through sequences of one or more network tools by a packet broker.

FIG. 2 illustrates how tagging mechanisms can be used to guide data packets through sequences of one or more network tools by a packet broker 202. Although the packet broker 202 could be implemented in software or hardware, commodity standardized hardware (e.g., Broadcom packet processors) is generally preferred due to the speed and volume of incoming traffic.

One key aspect is to divide the guiding process into two different steps. First, packet-matching criteria can be applied to a data packet by the packet broker 202 to determine a predetermined sequence of network tool(s) through which the data packet is to be guided. The packet broker 202 can then assign an internal identifier (e.g., a Virtual Local Area Network (VLAN) identifier) to the data packet that is indicative of the first network tool within the predetermined sequence. Second, the data packet can be guided through the predetermined sequence of network tool(s) based on the internal identifier. As further described below, the internal identifier can be translated to an external identifier before transmission to each network tool within the predetermined sequence, and then translated back to a different internal identifier upon reception from each of the network tools within the predetermined sequence. The internal and external identifiers are used by the packet broker 202 to properly route the data packet to the appropriate tool port(s) and egress network port.

A data packet is initially received at an Ingress Port 1 ($I_1$) 204a of a packet broker 202, which represents a visibility node in a visibility fabric. The data packet is typically one of many data packets that are transmitted to the packet broker 202 in a stream of traffic by an edge device or "source node" that is not part of the visibility fabric. After receiving the data packet, the packet broker applies packet-matching criteria to the data packet to identify an internal identifier that can be used to route the data packet to a tool egress port for transmission downstream to a network tool. The packet-matching criteria may be stored in a content-addressable memory (CAM) of the packet broker 202. The packet broker 202 then tags the data packet with the internal identifier.

Here, for example, the data packet is received at Ingress Port 1 ($I_1$) 204a and is tagged with the internal identifier "X" based on an identifier (ID) table 212 maintained by the packet broker 202. Note that although the packet-matching criteria of the ID table 212 are based on an ingress port identifier (i.e., $I_1$, $I_2$, and $I_3$), other criteria could also be used, including source node identifier, destination node identifier, a unique data packet identifier, packet length, transmission protocol, priority level, a payload data characteristic, an application port setting, a flow map, etc.

Accordingly, in some embodiments each ingress network port of the packet broker 202 is associated with a different internal identifier, while in other embodiments each internal identifiers are shared by the ingress network ports of the packet broker 202. The internal identifier is a metadata field that is added to the data packet when it enters the visibility fabric and stripped from the data packet before it leaves the visibility fabric (e.g., is forwarded to an egress network port 208a-c for transmission downstream toward a destination node).

While any known identification scheme could be used to generate the internal identifiers, particular identification schemes may be preferable in certain instances. For example, the packet broker 202 may include an ID table 212 that maps packet-matching criteria to Virtual Local Area Network (VLAN) identifiers. The internal identifiers can then be used by the packet broker 202 to identify a specific sequence of one or more network tools through which the corresponding data packets should be guided.

Upon determining the data packet should be guided through Network Tool 1 210a, the packet broker 202 identifies the appropriate tool port (i.e., Tool Port 1 ($T_1$) 206a) so that the data packet arrives at the correct destination.

In some embodiments, the egress network ports 208a-c of the packet broker 202 are communicatively coupled to the ingress ports of other packet brokers by stack links (i.e., physical cables) extending directly between the two ports. Note, however, that such embodiments typically require an understanding of how the visibility nodes within the visibility fabric are linked to one another in order to correctly forward incoming traffic for filtering, analyzing, etc.

Before forwarding the data packet to Tool Port 1 ($T_1$) 206a for transmission to Network Tool 1 210a, the packet broker 202 may translate the internal identifier to an external identifier. Upon subsequently receiving the data packet back from Network Tool 1 210a, the packet broker 202 can translate the external identifier back to the original internal identifier or a new internal identifier, which is used to guide the data packet to its next destination (i.e., another tool port or an egress network port). Thus, the internal and external identifiers are used by the packet broker 202 to guide the data packet within the visibility fabric.

In order to be able to share network tools across multiple traffic flows in an arbitrary manner, the packet broker 202 must be able to determine which data packets belong to which traffic flows when the data packets return from the network tools. The external identifiers can be used by the packet broker 202 to distinguish data packets received from a shared network tool from one another. For example, when a guiding arrangement specifies that multiple traffic flows are to be directed to a single network tool, the packet broker 202 may translate the internal identifiers associated with each traffic stream to different external identifiers before transmitting the data packets to the network tool.

Such schemes avoid the complex processing of packet-matching criteria on a per-network tool basis. Instead, guiding traffic flows can be divided into a series of steps. First, packet-matching criteria can be used to identify internal identifiers that are assigned to incoming data packets. Second, guiding arrangements composed of rule sets can be used to guide each incoming data packet through a sequence of one or more network tools based on its assigned internal identifier. For example, incoming data packets may be tagged with a Virtual Local Area Network (VLAN) identifier that enables VLAN arrangements (e.g., membership, tagging, and translation) to be used to efficiently and effectively guide the incoming data packets. In such embodiments, a switching fabric of packet broker 202 may include a VLAN Filtering Processor (VFP) that assigns the appropriate VLAN identifiers to incoming data packets.

Figure 3:
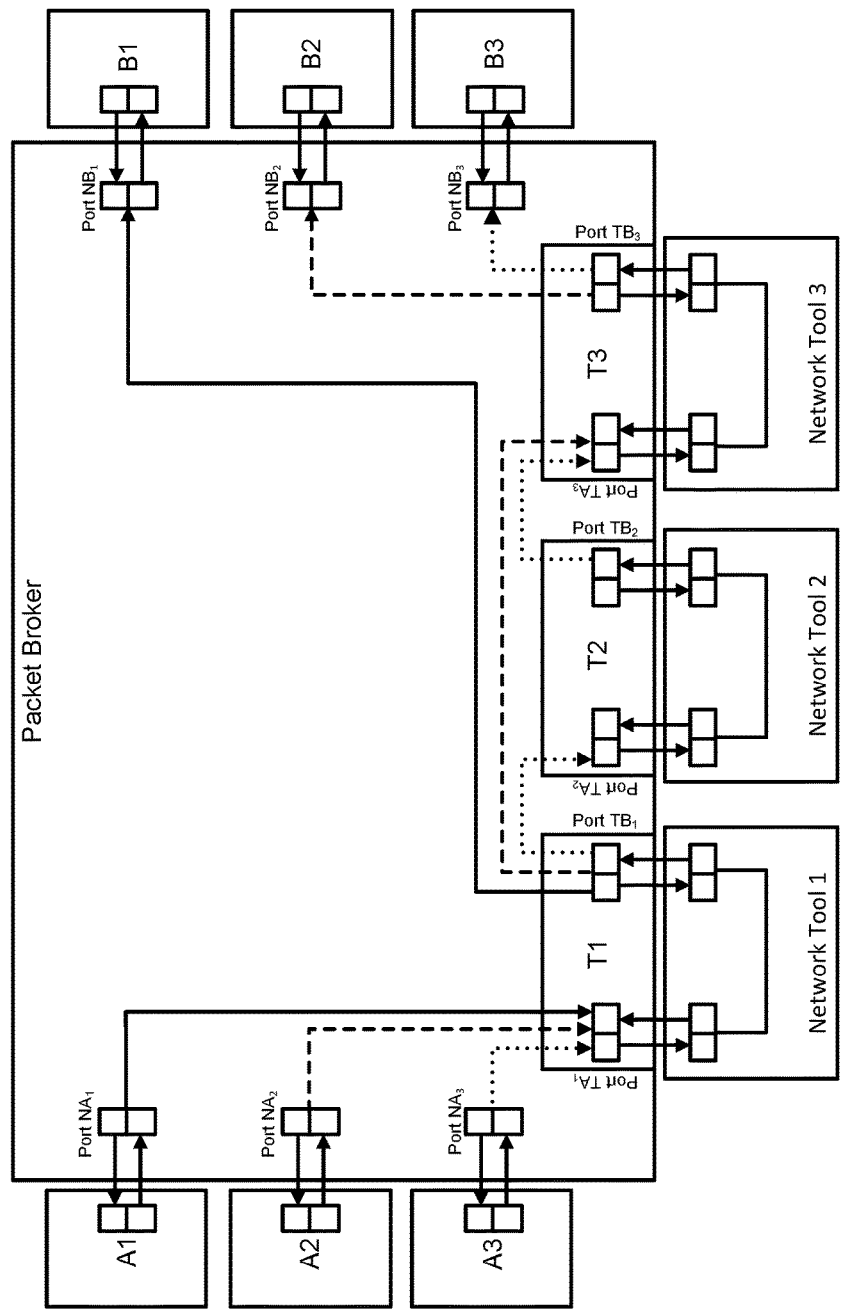
FIG. 3 illustrates how each data packet received by a packet broker can be assigned an internal identifier based on the ingress network port at which the data packet was received.
Figure 4:
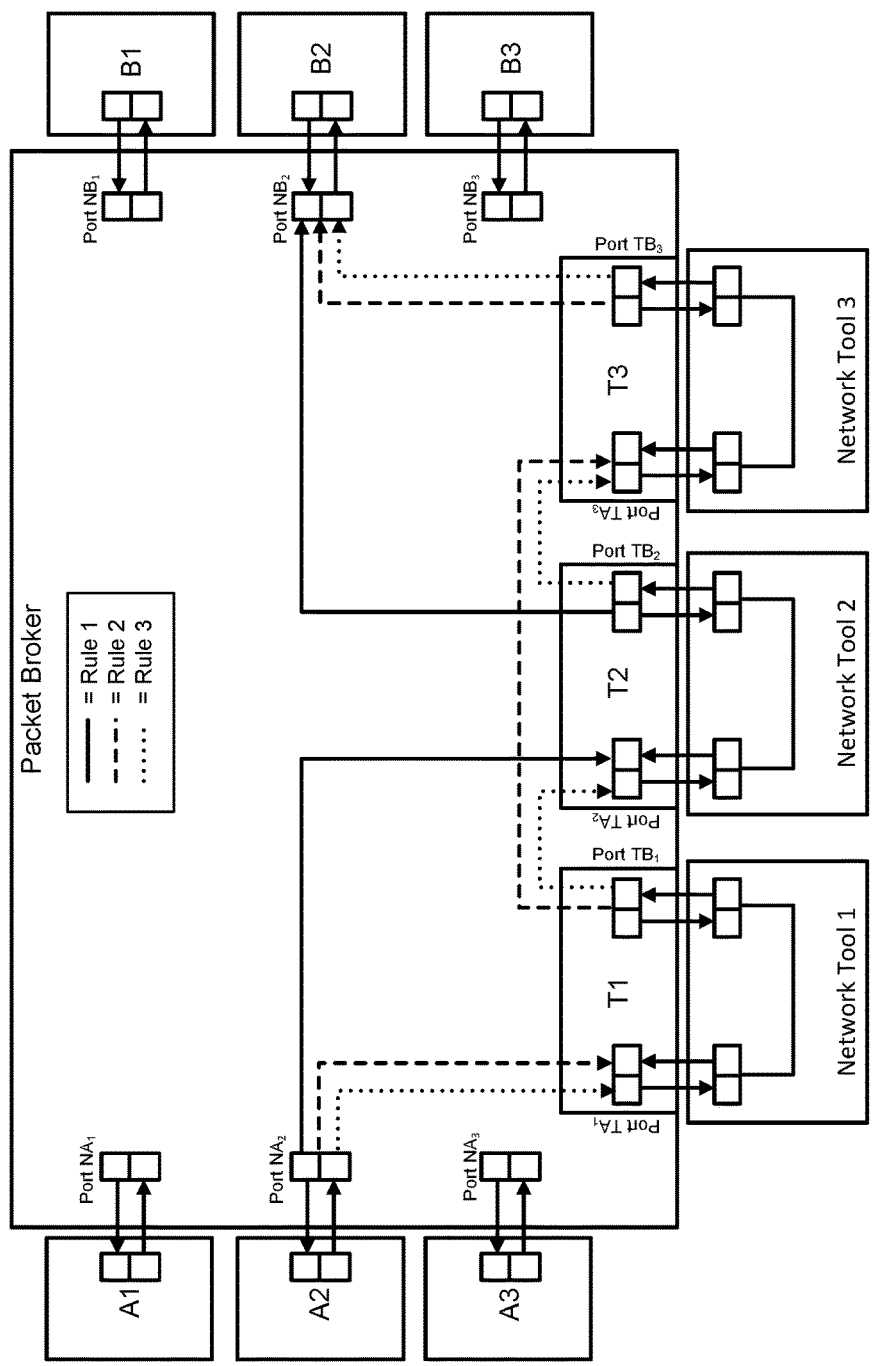
FIG. 4 illustrates how a packet broker can also guide data packets received at the same ingress network port through different network tools by applying packet-matching criteria to create rule-based traffic flows.

FIGS. 3-4 depict several different tagging schemes that are applicable to the embodiment shown in FIG. 2. Successful implementations of an appropriate tagging scheme generally require a physical (i.e., hardware-based) packet broker be used to guide data packets through a visibility fabric.

FIG. 3, for example, illustrates how each data packet received by a packet broker can be assigned an internal identifier based on the ingress network port at which the data packet was received. Port-based routing creates a "pass-all" scenario" because all of the data packets received at each ingress network port are treated the same.

FIG. 4, meanwhile, illustrates how a packet broker can also guide data packets received at the same ingress network port through different network tools by applying packet-matching criteria to create rule-based traffic flows. For example, the packet broker may utilize a VFP to assign data packets matching specific criteria to different VLAN identifiers. Once each rule-based traffic flow is represented by a unique VLAN identifier, the task of guiding the traffic flows through the network tool(s) is similar to port-based routing as shown in FIG. 3. Note, however, that rule-based routing may cause there to be more than one traffic flow per ingress network port. Among other advantages, using the VFP to convert packet-matching criteria into VLAN identifiers ensures that routing schemes (also referred to as "flow-guiding mechanisms") no longer depend on the packet-matching criteria themselves and can be executed the same regardless of whether the packet broker is configured for rule-based routing, port-based routing, or a mixture thereof.

Figure 5:
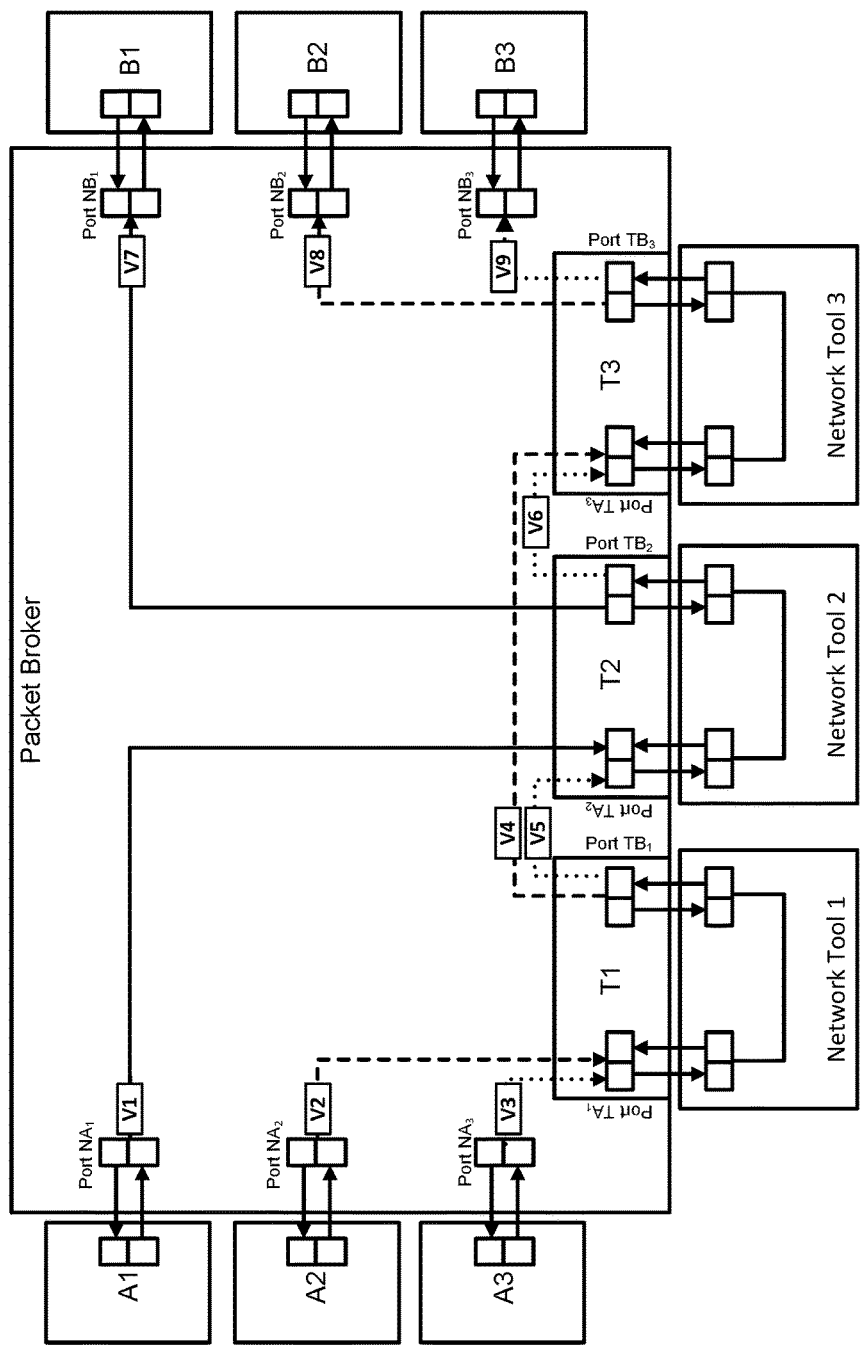
FIG. 5 illustrates how packet-matching criteria (also referred to as "rule-based ingress filters") can be used to guide data packets tagged with internal identifiers through the proper sequence of one or more network tools.
Figure 6:
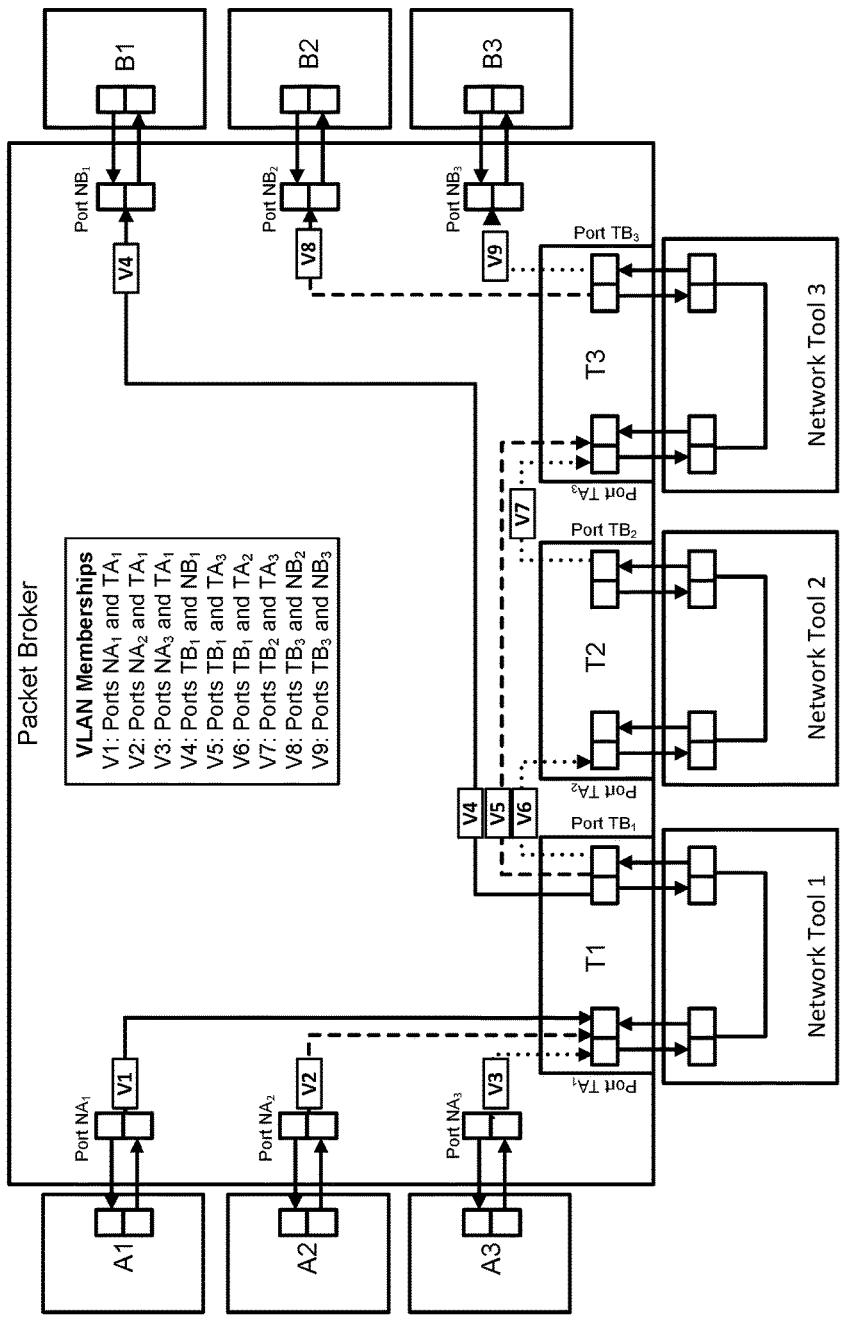
FIG. 6 illustrates how port-to-port channels and VLAN memberships can also be used by the packet broker to guide data packets tagged with internal identifiers through the proper sequence of tool port(s).

FIGS. 5-6 depict several different guiding arrangements that can be used to guide data packets received by a packet broker through one or more network tools. A switching fabric of the packet broker can implement either of these guiding arrangements using internal identifiers that are appended to the data packets as they as received by the packet broker.

FIG. 5 illustrates how packet-matching criteria (also referred to as "rule-based ingress filters") can be used to guide data packets tagged with internal identifiers through the proper sequence of one or more network tools. Thus, each data packet received by a packet broker can be dispatched in accordance with a guiding arrangement that specifies an ingress network port (i.e., an entry port), one or more packet-matching criteria, a sequence of network tool(s), and an egress network port (i.e., an exit port).

Initially, packet-matching criteria are applied to each incoming data packet to identify an appropriate internal identifier (e.g., a VLAN identifier) with which each data packet should be tagged. Thus, the internal identifier is assigned to each incoming data packet based on a characteristic of the data packet. The tagged data packets are then forwarded to a tool port for transmission to a network tool based on the internal identifier. Here, for example, data packets received at Network Port $NA_1$ are assigned internal identifier "V1" and forwarded to Tool Port $TA_2$, data packets received at Network Port $NA_2$ are assigned internal identifier "V2" and forwarded to Tool Port $TA_1$, and data packets received at Network Port NA₃ are assigned internal identifier "V3" and forwarded to Tool Port TA₁.

As further described below, an egress translation scheme and ingress translation scheme can be implemented by the packet broker at the egress tool port and ingress tool port, respectively, for some or all of the network tools connected to the packet broker. Implementing an egress translation scheme causes the internal identifier appended to each data packet by the packet broker to be translated to an external identifier before transmission to a corresponding network tool, while implementing an ingress translation scheme causes the external identifier appended to each data packet by the packet broker to be translated back to the original internal identifier or a new internal identifier. Internal identifiers can be readily translated to external identifiers using translation tables that are maintained at each egress tool port, while external identifiers can be readily translated to internal identifiers using translation tables that are maintained at each ingress tool port.

Accordingly, when a data packet is received back from one of the network tools, the packet broker may translate the external identifier to another internal identifier, which is then used to determine whether the data packet should be forwarded to another tool port for transmission to another network tool or to a network port for transmission downstream based on the internal identifier of the data packet. If the next destination or "hop" of the data packet is within the visibility fabric, the internal identifier may be preserved so that the data packet is forwarded to its next destination with its identifier (also referred to as a "tag") intact. However, if the next destination of the data packet resides outside of the visibility fabric (e.g., the data packet is to be forwarded to Network Port NB₁), the internal identifier can be stripped from the data packet before being transmitted downstream.

FIG. 6 illustrates how port-to-port channels and VLAN memberships can also be used by the packet broker to guide data packets tagged with internal identifiers through the proper sequence of tool port(s). Much like FIG. 5, upon receiving data packets at the ingress network ports (i.e., Network Ports NA₁, NA₂, and NA₃), the packet broker can apply packet-matching criteria to identify an appropriate internal identifier for each data packet and add the appropriate internal identifier to each data packet (e.g., by adding or modifying a metadata field). Here, unique internal identifiers are allocated and assigned to each data packet for each anticipated hop within the visibility fabric. Said another way, each internal identifier assigned to a data packet upon receipt by the packet broker may be unique across all traffic flows received by the packet broker and all network tools coupled directly to the packet broker, regardless of whether the ingress port is a network port or a tool port.

Moreover, some or all of the internal identifiers mapped to a single tool port can be translated to external identifiers before the corresponding data packets are transmitted to the network tool. As noted above, internal identifiers may be readily translated to external identifiers using a translation table. For example, the packet broker may maintain a VLAN translation table at each egress tool port that specifies the internal identifiers appended to data packets that are forwarded to a given egress tool port should be translated to different external identifiers before the data packets are forwarded to a network tool connected to the given egress tool port.

Such a technique enables the packet broker to guide a specific data packet to its next destination by parsing VLAN membership records to discover which port(s) a given internal identifier is mapped to. Here, for example, the VLAN membership records specify that data packets tagged with internal identifier V1 are to be guided from Network Port NA₁ to Tool Port TA₁, while data packets tagged with internal identifier V4 are to be guided from Tool Port TB₁ to Network Port NB₁. Each VLAN membership record represents a single "hop" between two ports. Together, the VLAN membership records enable the packet broker to efficiently route streams of traffic using internal identifiers rather than complex rules or packet-matching criteria.

Other techniques for guiding data packets through sequences of inline network tools can be found in U.S. application Ser. No. 14/938,700, which was filed on Nov. 11, 2015. The subject matter thereof is incorporated herein by reference in its entirety.

Figure 7:
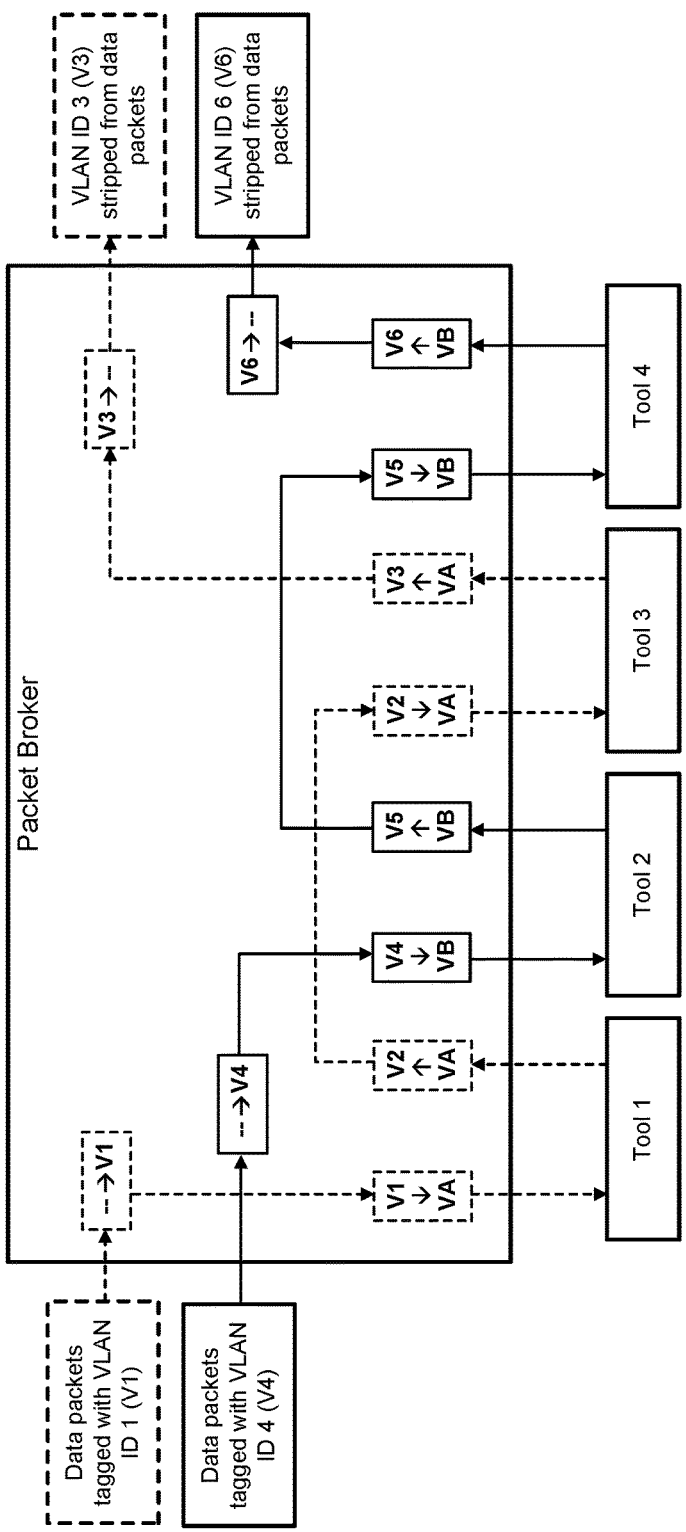
FIG. 7 depicts a packet broker that uses port-to-port channels to route two incoming traffic streams through different sequences of network tools.

FIG. 7 depicts a packet broker that uses port-to-port channels to route two incoming traffic streams through different sequences of network tools. Upon receiving a data packet at an ingress network port, the packet broker initially applies packet-matching criteria to the data packet to identify a unique internal identifier with which the data packet should be tagged. Here, for example, the packet broker automatically tags data packets received at a first ingress network port with VLAN identifier V1 and data packets received at a second ingress network port with VLAN identifier V4. Although the packet-matching criteria applied here cause internal identifiers to be assigned based on ingress network port, other data packet characteristics could also be considered, such as source node identifier, destination node identifier, a unique data packet identifier, packet length, transmission protocol, priority level, a payload data characteristic, an application port setting, a flow map, etc.

The packet broker (and, more specifically, a switching fabric) can use the unique internal identifiers to guide the data packets to the appropriate tool port. Here, for example, data packets tagged with VLAN identifier V1 are forwarded to an egress tool port corresponding to Network Tool 1. In some embodiments, the packet broker sets up an egress translation scheme at the egress tool port so that the unique internal identifier is translated to an external identifier (e.g., VLAN identifier VA) before transmission to Network Tool 1.

The packet broker can then set up an ingress translation scheme at an ingress tool port connected to Network Tool 1 so that the external identifier (e.g., VLAN identifier VA) is translated to a different internal identifier upon receipt of the data packets from Network Tool 1. Accordingly, upon receiving a data packet back from Network Tool 1, the packet broker can translate the external identifier (e.g., VLAN identifier VA) to a second internal identifier (e.g., VLAN identifier V2) that is unique across all traffic flows received by the packet broker and all network tools coupled directly to the packet broker. The second internal identifier can then be used to determine whether the data packet is to be forwarded to a another tool port for transmission to a different network tool, or to an egress network port for transmission downstream. Here, the second internal identifier (e.g., VLAN identifier V2) specifies that the data packet is to be guided through Network Tool 3 as well. Similar translation techniques can be performed so that the second internal identifier is translated to the same external identifier (or a different external identifier) before being transmitted to Network Tool 3, and then translated to a third internal identifier (e.g., VLAN identifier V3) upon being received by the packet broker. Before the data packet is transmitted downstream by the packet broker (i.e., before the data packet leaves an egress network port), the internal identifier can be stripped from the data packet.

As shown in FIG. 7, multiple traffic streams may be simultaneously or sequentially handled by the packet broker in a similar fashion. When each network tool is only responsible for analyzing the data packets of a single traffic flow (i.e., all data packets are assigned the same identifier), the packet broker can guide data packets without issue. However, accurate guiding can become problematic when the same network tool is shared by multiple traffic streams. In fact, such scenarios often make it difficult for the packet broker to determine which data packets belong to which traffic stream. Accordingly, the packet broker may translate the internal identifier(s) assigned to each traffic stream into a different external identifier in such embodiments, For example, the internal identifier(s) of data packets associated with a first traffic flow may be translated to external identifier VA, while the internal identifier(s) of data packets associated with a second traffic flow may be translated to external identifier VB. In some embodiments, a different external identifier is used each time a data packet leaves the packet broker for a network tool (e.g., external identifier VA may instead become VA1 and VA2).

The above description is written in terms of a bi-directional tool port; however, one skilled in the art will recognize the same techniques are equally applicable to uni-directional tool ports (i.e., separate egress and ingress tool ports). For the purposes of illustration, FIGS. 4-7 depict traffic flowing in one direction (i.e., from the ingress network ports to the egress network ports via one or more tool ports), but traffic can also flow in the reverse direction. In such embodiments, the ingress ports and egress ports may simply be described as "network ports" that are able to receive and transmit data packets.

Moreover, traffic paths can be symmetrical or asymmetrical in nature. That is, the sequence of network tool(s) visited when going one direction between two network ports may be the same or different than the sequence of network tool(s) visited when going in the opposite direction. All of the techniques described herein are equally applicable regardless of which direction traffic is flowing. Although many of the transmission paths described herein are shown as half duplex wires (i.e., only transmit information in one direction), full duplex wires capable of transmitting information in both directions could also be used for some or all of the transmission paths within the packet broker.

Figure 8:
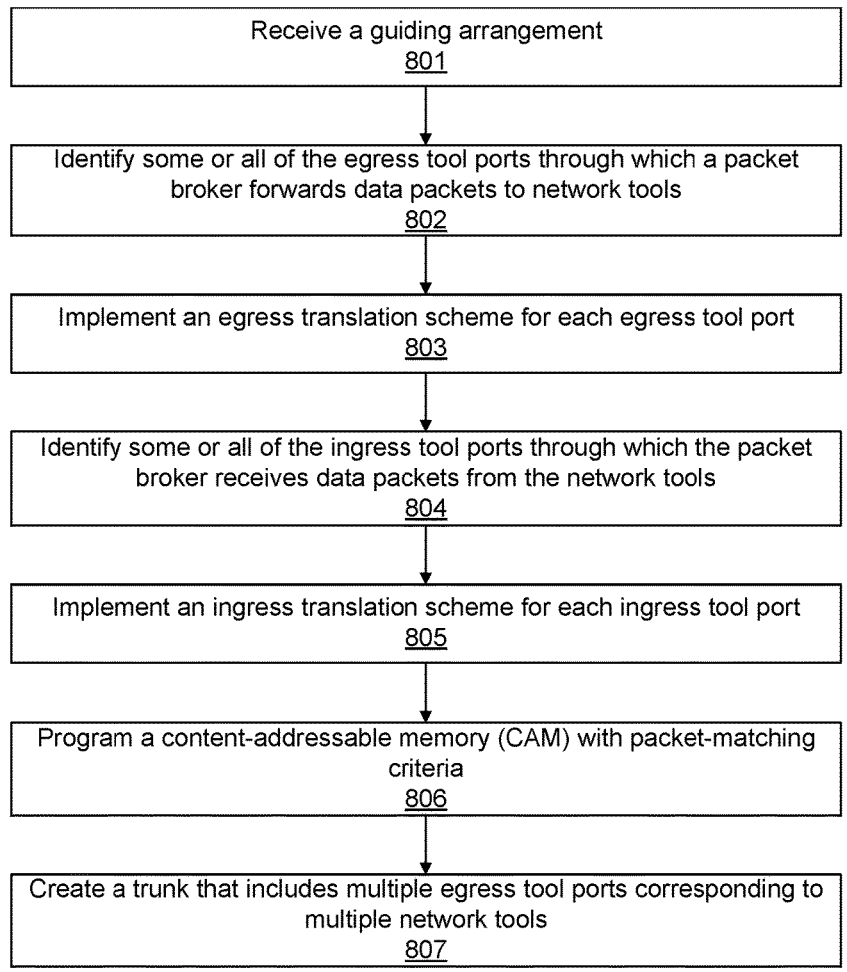
FIG. 8 depicts a process for configuring a guiding arrangement that is to be implemented by a packet broker.

FIG. 8 depicts a process 800 for configuring a guiding arrangement that is to be implemented by a packet broker. A packet broker initially receives a guiding arrangement input by an administrator (step 801). The guiding arrangement is indicative to the packet broker of how to guide incoming data packets belonging to a specific traffic flow through a specific sequence of network tool(s) that are connected to the packet broker. A guiding arrangement can specify an ingress network port (i.e., an interface of the packet broker through which the data packets are received), a sequence of one or more network tools, a direction, an egress network port (i.e., an interface of the packet broker through which the data packets are forwarded downstream), and an internal identifier. As further described below, the guiding arrangement may also include rules for responding to status changes (e.g., failures and recoveries) of the network tool(s) within the sequence.

The packet broker can then identify some or all of the egress tool ports through which the packet broker forwards data packets to the network tools (step 802). The packet broker can implement an egress translation scheme for each egress tool port (step 803). The egress translation scheme causes an internal identifier appended to each data packet by the packet broker to be translated to an external identifier before transmission to a corresponding network tool.

The packet broker can also identify some or all of the ingress tool ports through which the packet broker receives data packets from the network tools (step 804), and then implement an ingress translation scheme for each ingress tool port (step 805). The ingress translation scheme causes the external identifier appended to each data packet by the packet broker to be translated to another internal identifier. For example, the internal identifier of a given data packet may be translated to a unique value each time the given data packet is received by the packet broker from a network tool.

In some embodiments, the packet broker programs a content-addressable memory (CAM) with packet-matching criteria (step 806). The packet-matching criteria are applied to incoming data packets upon receipt at an ingress network port of the packet broker. Thus, a metadata field specifying an internal identifier can be added to each incoming data packet upon receipt by the packet broker.

The packet broker may also create a trunk that includes multiple egress tool ports corresponding to multiple network tools (step 807). Creation of the trunk may cause a particular data packet having an internal identifier associated with one of the multiple egress tool ports to be broadcast to all of the multiple egress tool ports.

Figure 9:
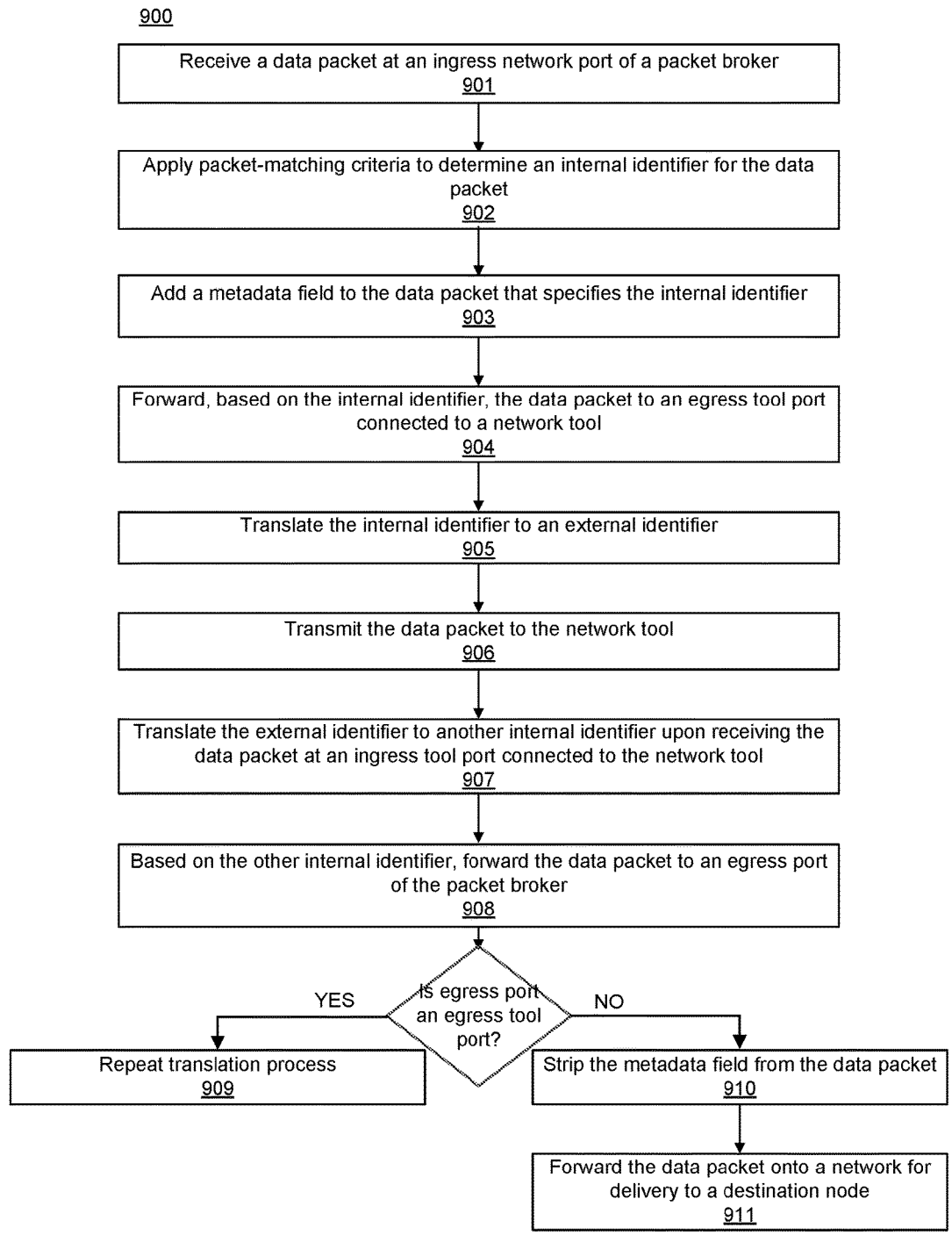
FIG. 9 depicts a process for guiding traffic flows through sequences of network tools.

FIG. 9 depicts a process 900 for guiding traffic flows through sequences of network tools. A data packet is initially received at an ingress network port of a packet broker (step 901). The packet broker can then apply packet-matching criteria to determine an internal identifier for the data packet (step 902). The packet-matching criteria can analyze one or more characteristics of the data packet, such as an ingress port identifier, a source node identifier, a destination node identifier, a unique packet identifier, a packet length, a transmission protocol, a priority level identifier, a payload data characteristic, an application port setting, or some combination thereof. The internal identifier corresponds to a predetermined sequence of network tool(s) through which the data packet is to be guided. The packet broker may add a metadata field to the data packet that specifies the internal identifier (step 903).

The packet broker can then guide the data packet through the predetermined sequence of network tool(s) by translating the internal identifier to an external identifier before transmission to each of the network tool(s) and translating the external identifier to a different internal identifier after reception from each of the network tool(s). Said another way, the packet broker may guide the data packet through each network tool by employing ingress and egress translation schemes.

For example, the packet broker may forward the data packet to an egress tool port connected to a network tool based on the internal identifier appended to the data packet by the packet broker (step 904). In some embodiments, the internal identifier is translated to an external identifier (e.g., in accordance with an egress translation scheme corresponding to an egress tool port) (step 905), and the data packet is forwarded to the egress tool port for transmission to the network tool (step 906).

Upon receiving the data packet at an ingress tool port connected to the network tool, the packet broker can translate the external identifier to another internal identifier (e.g., in accordance with an ingress translation scheme corresponding to the ingress tool port) (step 907). Each internal identifier used by the packet broker may be unique across all traffic flows received by the packet broker and all network tools coupled to the packet broker. Accordingly, the packet broker may tag the data packet with a different internal identifier each time the data packet is received by the packet broker.

Based on the other internal identifier, the packet broker forwards the data packet to an egress port of the packet broker (step 908). When the egress port is another egress tool port connected to another network tool within the predetermined sequence, the above process can be repeated by applying the ingress and egress translation schemes corresponding to that egress tool port (step 909). However, when the egress port is an egress network port, the packet broker can strip the metadata field from the data packet (step 910) and forward the data packet onto a network for delivery to a destination node (e.g., an edge device) communicatively coupled to the egress network port (step 911).

Unless contrary to physical possibility, it is envisioned that the steps described above may be performed in various sequences and combinations. For example, the CAM may be programmed with packet-matching criteria before the egress tool ports and/or ingress tool ports are identified by the packet broker. Other steps could also be included in some embodiments.

Statistical Multiplexing of Network Tools

Packet brokers can readily route traffic flows through sequences of network tools using the techniques described above, However, in some instances, it may be desirable for data packets to visit the network tools in a load-balanced manner rather than a cascaded manner.

Accordingly, the packet broker may initially form a trunk group (i.e., a predefined group of ports that are treated as one port) based on input provided by an administrator. A group of network tools that share a load (i.e., a traffic flow) through trunking facilitated by the packet broker are referred to as a "trunk group" of network tools. Note that such an implementation will allow these network tools to share the load roughly evenly over time, though small groups of data packets may not evenly distributed.

Upon determining that a data packet should be guided to a port in the trunk group, the packet broker can execute a hashing mechanism (e.g., an algorithm or function) to generate a hash value for the data packet and dispatch the data packet based on the hash value. The administrator may specify which field(s) in the data packet should be subject to the hashing mechanism. For example, the packet broker may dispatch data packets based on hash values created for each data packet's Internet Protocol (IP) source and IP destination. In such embodiments, the packet broker will generate a single hash value for each data packet that is based on two criteria. The data packets that generate a first hash value may be dispatched to a first network tool of the trunk group, while the data packets that generate a second hash value may be dispatched to a second network tool of the trunk group.

Figure 10:
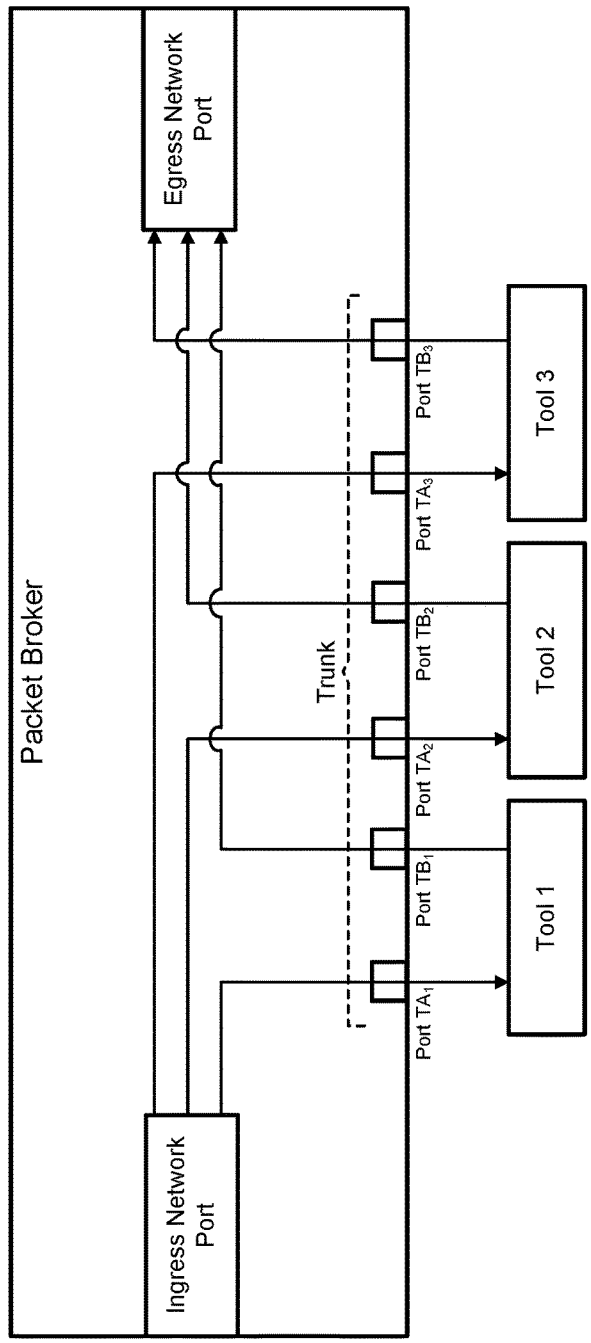
FIG. 10 depicts how a packet broker may implement trunking in combination with the guiding techniques described above.

FIG. 10 depicts how a packet broker may implement trunking in combination with the guiding techniques described above. This allows the packet broker to readily respond to changes in the state of a trunk group. The "state" of the trunk group is declared to be "up" (i.e., ready for service) if the number of network tools within the trunk group that are "up" is higher than a specified threshold. Conversely, the "state" of the trunk group is declared to be "down" (i.e., out of service) if the number of network tools within the trunk that are "up" is lower than the specified threshold.

When a single network tool goes "down," the traffic flow should be redistributed to those network tools that are still "up." However, conventional hashing mechanisms struggle to accomplish this in several scenarios.

Here, the packet broker includes three egress tool ports (i.e., Port $TA_1$, Port $TA_2$, and Port $TA_3$). If all three ports are made members of a single VLAN membership group and a single trunk group, then an incoming data packet tagged with the corresponding VLAN identifier will be distributed according to hash value amongst these three egress tool ports. Such a scenario is referred to as "strict alignment" of the trunk group and the VLAN membership group.

However, the traffic flow may not be dispatched correctly if some form of misalignment exists. For example, if one of the egress tool ports is included in the VLAN membership group but not the trunk group, then the packet broker will broadcast data packets to both the trunk group and the egress tool port not included in the trunk group. Consequently, multiple copies of incoming data packets will be handled by the packet broker and subsequently forwarded to the egress network port for transmission downstream. Such a scenario may be referred to as a "broadcast storm."

As another example, if one of the egress tool ports is included in the trunk group but not the VLAN membership group, then the packet broker may inadvertently drop some data packets. For instance, the packet broker may dispatch data packets having a first hash value to Port $TA_1$ and data packets having a second hash value to Port $TA_2$. However, because Port $TA_3$ is not included in the VLAN membership group, data packets having a third hash value will simply be dropped by the packet broker.

Accordingly, the packet broker must synchronize the VLAN membership group and the trunk group when there is a change in the state of one of the network tools. More specifically, when a network tool goes "down" (i.e., out of service), the network tool must be removed from both the VLAN membership group and the trunk group. Individual network tools can be removed from the VLAN membership group and the trunk group by the packet broker until the state of the trunk group changes. As noted above, the "state" of the trunk group is declared to be "up" if the number of network tools within the trunk group that are "up" is higher than a specified threshold, while the "state" of the trunk group is declared to be "down" if the number of network tools within the trunk that are "up" is lower than the specified threshold. Upon determining the number of available network tools falls below the specified threshold, the packet broker can specify the entire trunk group of network tools as defective. In such embodiments, the packet broker must also readjust the egress translation schemes and ingress translation schemes implemented at the egress tool ports and ingress tool ports, respectively, to avoid those defective network tools.

Status Monitoring of Network Tools

The guiding techniques described above also offers flexible support for multiple network tool operational modes. For example, a packet broker may be able to readily address changes in the state of a network tool connected to the packet broker by modifying certain egress translation schemes and/or ingress translation schemes. The "state" of a network tool can be "up" (i.e., ready for service) or "down" (i.e., out of service) based on, for example, the network tool's ability to pass through health-probing data packets dispatched by the packet broker.

Figure 11A:
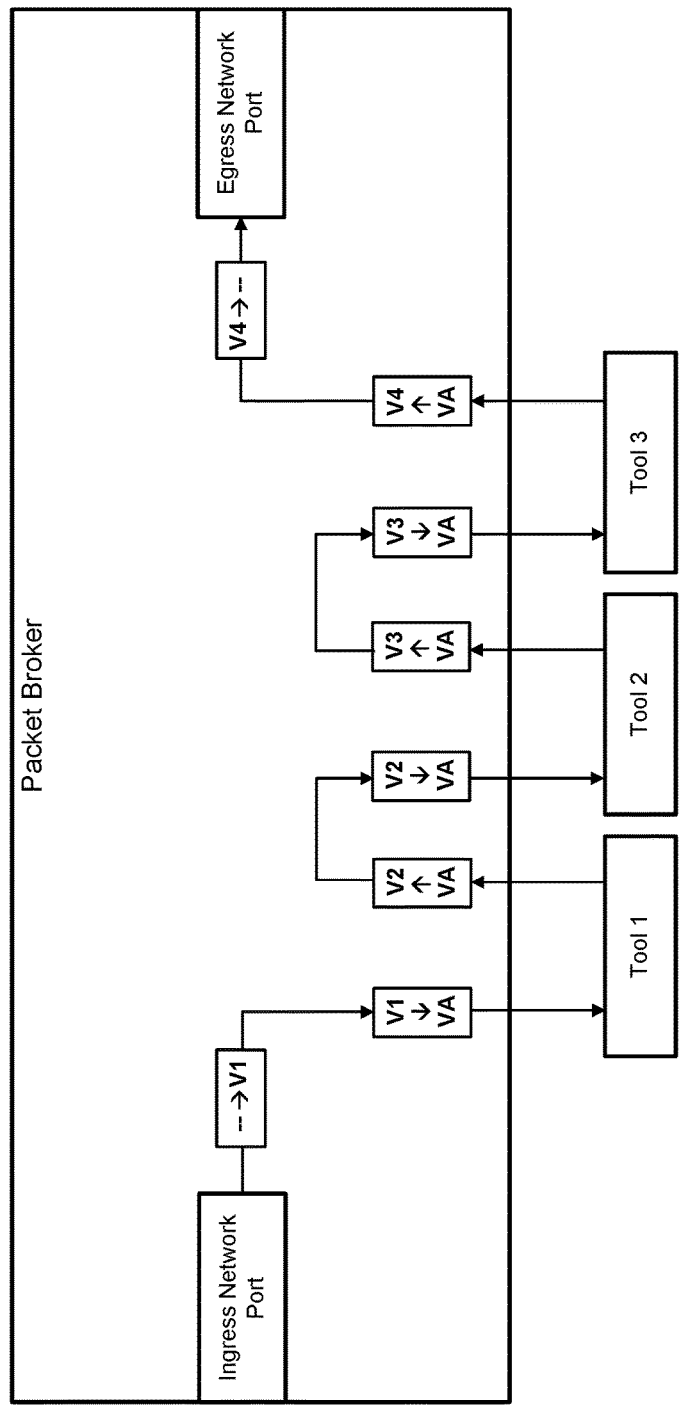
FIG. 11A depicts how a data packet can be guided through a predetermined sequence of three network tools that are connected to a packet broker.

FIG. 11A depicts how a data packet can be guided through a predetermined sequence of three network tools that are connected to a packet broker. As noted above, this can be accomplished by applying packet-matching criteria upon receipt of the data packet at the ingress network work to identify an internal identifier (e.g., V1), and then translating the internal identifier to a different value each time the data packet is received by the packet broker from one of the network tools.

Figure 11B:
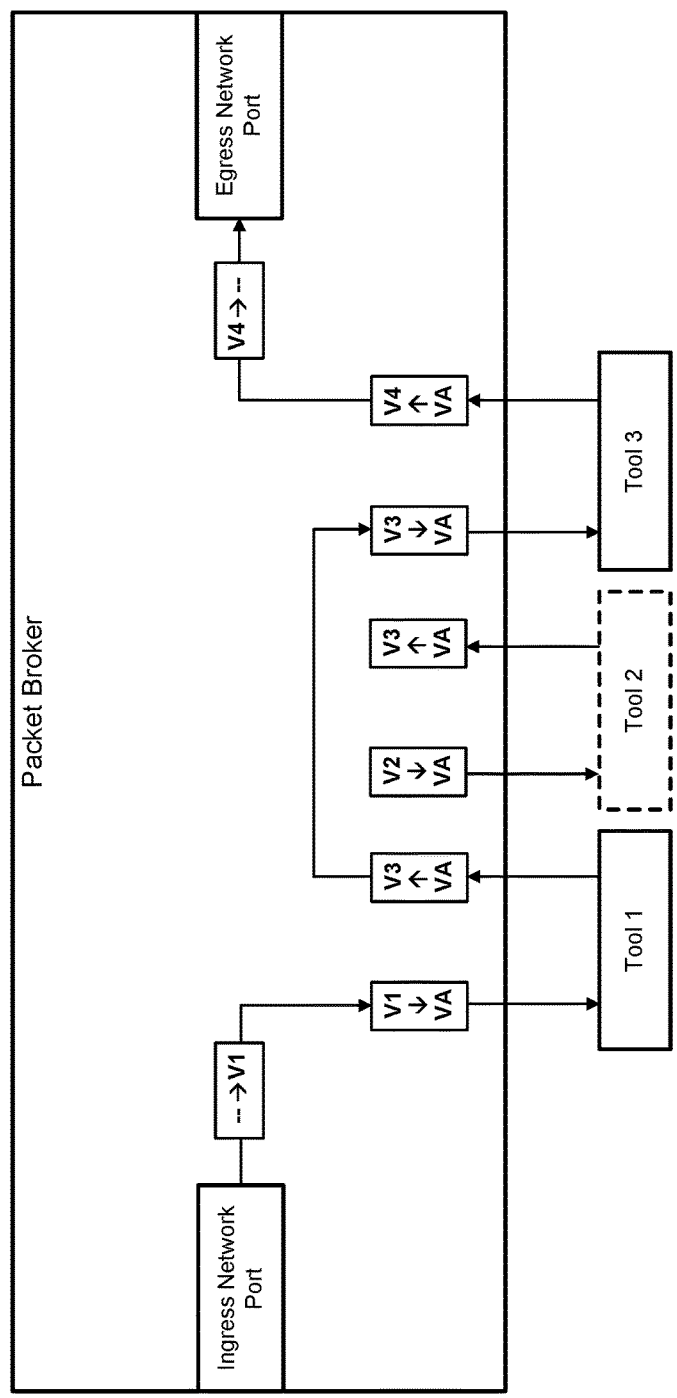
FIG. 11B depicts how modification of the ingress translation scheme by the packet broker causes the data packet to bypass an affected network tool.

Because the network tools are often deployed as inline devices, changes in the state of the network tools can be particularly disruptive. Accordingly, upon discovering there has been a change in the state of a network tool, the packet broker can dynamically modify the ingress translation scheme of the ingress tool port connected to the network tool immediately upstream of the affected network tool. FIG. 11B depicts how modification of the ingress translation scheme by the packet broker causes the data packet to bypass the affected network tool. Once the state change has been addressed (e.g., by addressing the issue or replacing the affected network tool), the packet broker can modify the ingress translation scheme so that traffic is once again guided along its original course. Some or all of the network tools connected to the packet broker may be bypassed in such a manner at any given point in time.

Processing System

Figure 12:
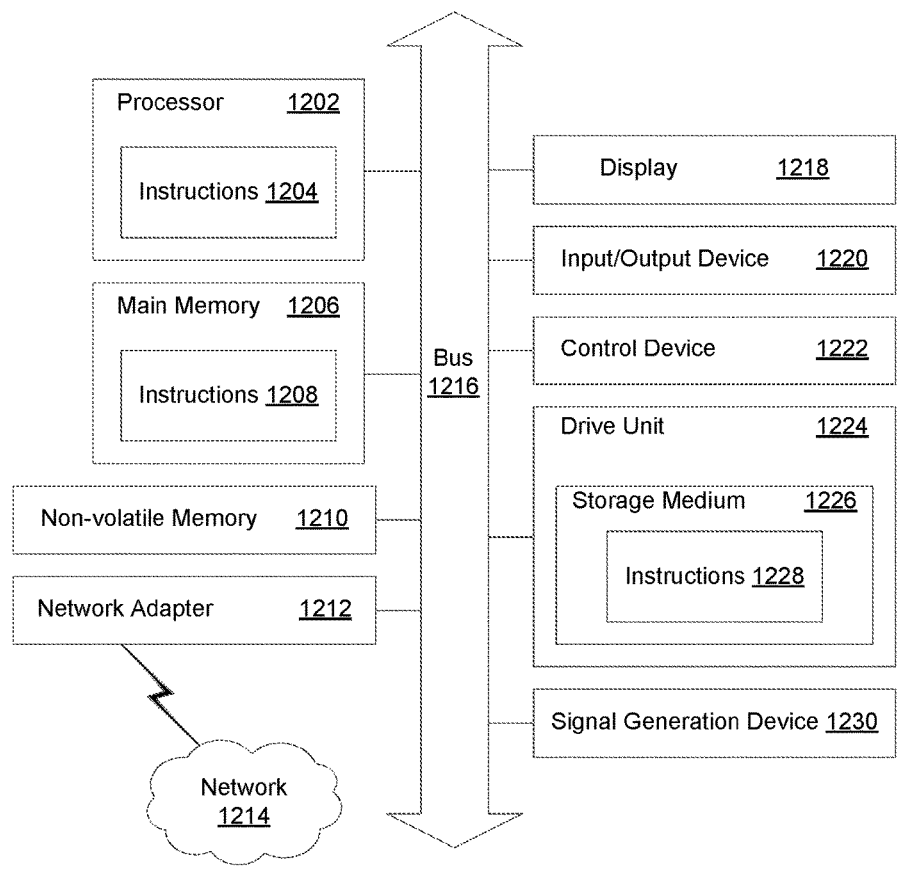
FIG. 12 is a high-level block diagram illustrating an example of a processing system in which at least some operations described herein can be implemented.

FIG. 12 is a block diagram illustrating an example of a processing system 1200 in which at least some operations described herein can be implemented. For example, the processing system 1200 may be responsible for generating an interface through which an administrator manually associates traffic flows with identifiers. As another example, at least a portion of the processing system 1200 may be included in a network appliance (in that case, the processing system 1200 may not include a display 1218, but could instead include a switching fabric and one or more network ports). The computing system may include one or more central processing units ("processors") 1202, main memory 1206, non-volatile memory 1210, network adapter 1212 (e.g., network interfaces), display 1218, input/output devices 1220, control device 1222 (e.g., keyboard and pointing devices), drive unit 1224 including a storage medium 1226, and signal generation device 1230 that are communicatively connected to a bus 1216. The bus 1216 is illustrated as an abstraction that represents any one or more separate physical buses, point to point connections, or both connected by appropriate bridges, adapters, or controllers. The bus 1216, therefore, can include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire." A bus may also be responsible for relaying data packets (e.g., via full or half duplex wires) between components of the network appliance, such as the switching fabric, network port(s), tool port(s), etc.

In various embodiments, the processing system 1200 operates as a standalone device, although the processing system 1200 may be connected (e.g., wired or wirelessly) to other machines. For example, the processing system 1200 may include a terminal that is coupled directly to a network appliance. As another example, the computing system 1200 may be wirelessly coupled to the network appliance.

In various embodiments, the processing system 1200 may be a server computer, a client computer, a personal computer (PC), a user device, a tablet PC, a laptop computer, a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by the computing system.

While the main memory 1206, non-volatile memory 1210, and storage medium 1226 (also called a "machine-readable medium) are shown to be a single medium, the term "machine-readable medium" and "storage medium" should be taken to include a single medium or multiple media (e.g., a centralized or distributed database, and/or associated caches and servers) that store one or more sets of instructions 828. The term "machine-readable medium" and "storage medium" shall also be taken to include any medium that is capable of storing, encoding, or carrying a set of instructions for execution by the computing system and that cause the computing system to perform any one or more of the methodologies of the presently disclosed embodiments.

In general, the routines executed to implement the embodiments of the disclosure, may be implemented as part of an operating system or a specific application, component, program, object, module, or sequence of instructions referred to as "computer programs." The computer programs typically comprise one or more instructions (e.g., instructions 1204, 1208, 1228) set at various times in various memory and storage devices in a computer, and that, when read and executed by one or more processing units or processors 1202, cause the processing system 1200 to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include recordable type media such as volatile and non-volatile memory devices 1210, floppy and other removable disks, hard disk drives, optical disks (e.g., Compact Disk Read-Only Memory (CD ROMS), Digital Versatile Disks (DVDs)), and transmission type media such as digital and analog communication links.

The network adapter 1212 enables the processing system 1200 to mediate data in a network 1214 with an entity that is external to the processing system 1200, such as a network appliance, through any known and/or convenient communications protocol supported by the processing system 1200 and the external entity. The network adapter 1212 can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 1212 can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

Other network security functions can be performed or included in the functions of the firewall, including intrusion prevention, intrusion detection, next-generation firewall, personal firewall, etc.

As indicated above, the techniques introduced here implemented by, for example, programmable circuitry (e.g., one or more microprocessors), programmed with software and/or firmware, entirely in special-purpose hardwired (i.e., non-programmable) circuitry, or in a combination or such forms. Special-purpose circuitry can be in the form of, for example, one or more application-specific integrated circuits (ASICs), programmable logic devices (PLDs), field-programmable gate arrays (FPGAs), etc.

Note that any of the embodiments described above can be combined with another embodiment, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
  receiving a packet guidance arrangement at a packet broker, the packet guidance arrangement indicative to the packet broker of how to forward a plurality of data packets through a specific sequence of a plurality of inline inspection devices, each of which is coupled directly to the packet broker, the packet broker being configured to send each data packet of the plurality of data packets to each of the inline inspection devices in said specific sequence such that after being sent to any one of the inline inspection devices, each data packet of the plurality of data packets returns to the packet broker for subsequent forwarding by the packet broker to another one of the inline inspection devices in the specific sequence or to another destination;
  identifying a plurality of ingress ports through which the packet broker receives data packets from the inline inspection devices;
  for each ingress port of the plurality of ingress ports,
  implementing an ingress translation scheme by which an external identifier appended to each data packet by the packet broker is translated to an internal identifier;
  monitoring a current state of each inline inspection device of the plurality of inline inspection devices coupled to the packet broker;
  determining a particular inline inspection device in the specific sequence of inline inspection devices has experienced a state change; and
  based on a determination that the particular inline inspection device in the specific sequence of inline inspection devices has experienced the state change, redirecting a traffic flow by automatically adjusting a particular ingress translation scheme corresponding to an inline inspection device that immediately precedes the particular inline inspection device in the specific sequence of inline inspection devices,
  wherein said redirecting the traffic flow by adjusting the particular ingress translation scheme includes translating an external identifier of a data packet corresponding to the inline inspection device that immediately precedes the particular inline inspection device to a new internal identifier corresponding to another inline inspection device in the specific sequence of inline inspection devices without modifying the packet guidance arrangement.

2. The method of claim 1, wherein the internal identifier is used by the packet broker to guide the data packet to a next hop in the specific sequence of inline inspection devices.

3. The method of claim 1, wherein each internal identifier assigned to a data packet upon receipt by the packet broker is unique across all traffic flows received by the packet broker and all inline inspection devices coupled directly to the packet broker.

4. The method of claim 1, wherein the plurality of inline inspection devices includes an intrusion detection system, an intrusion prevention system, or both.

5. The method of claim 1, wherein the state change includes the particular inline inspection device coming online, and wherein automatically adjusting the particular ingress translation scheme corresponding to the inline inspection device immediately preceding the particular inline inspection device in the specific sequence of inline inspection devices causes the traffic flow to be directed toward the particular inline inspection device.

6. The method of claim 1, wherein the state change includes the particular inline inspection device going offline, and wherein automatically adjusting the particular ingress translation scheme corresponding to the inline inspection device immediately preceding the particular inline inspection device in the specific sequence of inline inspection devices causes the traffic flow to bypass the particular inline inspection device.

7. The method of claim 1, wherein the internal identifier and the external identifier are Virtual Local Area Network (VLAN) identifiers.

8. The method of claim 1, wherein automatically adjusting the particular ingress translation scheme comprises modifying an entry in a dedicated memory that causes incoming data packets having a particular external identifier to be guided to the particular inline inspection device.

9. A method comprising:
  monitoring a current state of each inline inspection device of a plurality of inline inspection devices, each of which is coupled directly to a packet broker that is configured to forward a plurality of data packets through a specific sequence of inline inspection devices, the packet broker being configured to send each data packet of the plurality of data packets to each of the inline inspection devices in said specific sequence such that after being sent to any one of the inline inspection devices, each data packet of the plurality of data packets returns to the packet broker for subsequent forwarding by the packet broker to another one of the inline inspection devices in the specific sequence or to another destination;
  determining that a particular inline inspection device in the specific sequence of inline inspection devices has experienced a state change; and
  based on a determination that the particular inline inspection device in the specific sequence of inline inspection devices has experienced the state change, redirecting a traffic flow by automatically adjusting an ingress translation scheme corresponding to an inline inspection device immediately preceding the particular inline inspection device in the specific sequence of inline inspection devices,
wherein said redirecting the traffic flow includes translating an external identifier of a data packet corresponding to the inline inspection device that immediately precedes the particular inline inspection device to a new internal identifier corresponding to another inline inspection device in the specific sequence of inline inspection devices without modifying the packet guidance arrangement.

10. The method of claim 9, wherein the packet broker guides the data packets through the specific sequence of inline inspection devices in accordance with a packet guidance arrangement specified by a user.

11. The method of claim 9, wherein the particular inline inspection device is shared across multiple traffic flows.

12. The method of claim 11, wherein the packet broker dynamically redirects each of the multiple traffic flows upon determining the particular inline inspection device has experienced the state change.

13. The method of claim 9, further comprising:
receiving the traffic flow at a network ingress port of the packet broker connected to a network; and
guiding the traffic flow through the specific sequence of inline inspection devices by
translating an internal identifier added to each data packet within the traffic flow to an external identifier before transmission to each of the inline inspection devices, and
translating the external identifier to a different internal identifier each time a data packet is received at a tool ingress port coupled to one of the inline inspection devices.

14. The method of claim 13, wherein each internal identifier is a Virtual Local Area Network (VLAN) identifier that is used to guide the data packet to a next hop in the specific sequence of inline network tools.

15. The method of claim 13, wherein the external identifier enables the packet broker to distinguish the data packet from other data packets corresponding to other traffic flows that are guided through a given inline inspection device.

16. The method of claim 13, wherein said guiding is performed by a programmable switching fabric in the packet broker.

17. A packet broker comprising:
a network port at which to receive a plurality of data packets transmitted over a network to which the packet broker is connected when the packet broker is in operation;
a plurality of tool egress ports through which to forward a traffic flow to a specific sequence of a plurality of inline network tools that are external to the packet broker and each coupled directly to the packet broker when the packet broker is in operation;
a plurality of tool ingress ports through which to receive the traffic flow from the plurality of inline network tools when the packet broker is in operation; and
a programmable switching fabric configured to, when the packet broker is in operation:
send each data packet of the plurality of data packets to each of the inline network tools in said specific sequence such that after being sent to any one of the inline network tools, each data packet of the plurality of data packets returns to the packet broker for subsequent forwarding by the packet broker to another one of the inline inspection devices in the specific sequence or to another destination;
monitor a current state of each inline network tool of the plurality of inline network tools;
determine a particular inline network tool of the plurality of inline network tools has experienced a state change; and
based on a determination that the particular inline inspection device has experienced the state change, redirect the traffic flow by automatically adjusting a particular ingress translation scheme corresponding to a tool ingress port for an inline network tool that immediately precedes the particular inline network tool in the specific sequence,
wherein said redirect the traffic flow includes translating an external identifier of a data packet corresponding to the inline inspection device that immediately precedes the particular inline inspection device to a new internal identifier corresponding to another inline inspection device in the specific sequence of inline inspection devices without modifying the packet guidance arrangement.

18. The packet broker of claim 17, further comprising:
a plurality of dedicated memories hosted at each of the plurality of tool egress ports, that includes an egress translation scheme for the corresponding tool egress port,
wherein each egress translation scheme causes an internal identifier appended to each data packet by the programmable switching fabric to be translated to an external identifier.

19. The packet broker of claim 17, wherein each of the plurality of tool ingress ports corresponds to an ingress translation scheme hosted in a dedicated memory, and wherein each ingress translation scheme causes an external identifier appended to each data packet by the programmable switching fabric to be translated to an internal identifier.

20. The packet broker of claim 17, wherein the state change includes the particular inline network tool coming online or going offline.

21. The packet broker of claim 19, wherein each internal identifier is a Virtual Local Area Network (VLAN) identifier that is used to guide a data packet to a next hop in the specific sequence.

22. The packet broker of claim 18, wherein the particular inline network tool is shared across multiple traffic flows.

23. The packet broker of claim 22, wherein the external identifier is unique across the multiple traffic flows, and wherein the external identifier enables the packet broker to distinguish a data packet corresponding to the traffic flow from other data packets corresponding to other traffic flows guided through the particular inline network tool.

24. The packet broker of claim 17, wherein the specific sequence is specified by a user.

* * * * *